United States Patent [19]
Knodt et al.

[11] Patent Number: 5,987,535
[45] Date of Patent: Nov. 16, 1999

[54] USER INTERFACE PROVIDING IMMEDIATE STATUS AND CAPABILITY INDICATORS OF AN IMAGING SYSTEM ON A NETWORK BY DISPLAYING CHANNEL CONNECTIONS, FEATURES IN USE, AVAILABILITY, AND CURRENT OPERATIONS

[75] Inventors: Ruediger W. Knodt, Rochester; Andrew T. Martin, Webster; Michael W. Barrett, Fairport, all of N.Y.

[73] Assignee: Xerox Corporation, Stamford, Conn.

[21] Appl. No.: 08/929,519

[22] Filed: Sep. 15, 1997

[51] Int. Cl.⁶ .............................. G06F 13/10; G06F 3/14
[52] U.S. Cl. .............................. 710/15; 710/16; 710/17; 710/18; 710/19; 709/224; 364/188
[58] Field of Search ..................... 364/188, 146, 364/148.04, 578, 514 A, 254.6, 943, 948.2, 948.22, 326; 395/500, 200.54, 701, 702; 710/15, 16, 17, 18, 19; 709/224

[56] References Cited

U.S. PATENT DOCUMENTS

| | | |
|---|---|---|
| 5,446,454 | 8/1995 | Koike .............................. 340/825.52 |
| 5,450,571 | 9/1995 | Rosekrans et al. ..................... 395/500 |
| 5,513,126 | 4/1996 | Harkins et al. ..................... 364/514 A |
| 5,576,946 | 11/1996 | Bender et al. .......................... 364/146 |
| 5,613,213 | 3/1997 | Naddell et al. ........................ 455/54.1 |
| 5,751,965 | 5/1998 | Mayo et al. ....................... 395/200.54 |
| 5,761,399 | 6/1998 | Asano .................................... 395/114 |

*Primary Examiner*—Thomas C. Lee
*Assistant Examiner*—Ilwoo Park
*Attorney, Agent, or Firm*—Ronald F. Chapuran

[57] ABSTRACT

A method of providing immediate status and capability indicators of an imaging device to an operator by displaying at the user interface display screen an indicator of imaging device features available for operation and a display of imaging device features not available for operation. There is also provided a display of imaging device features in use by animating the display screen and there are displayed connecting channels indicating connection of the imaging device to other devices on the network. Finally, there is presented to the operator a manifestation of the capability of concurrent feature operation of the imaging device.

7 Claims, 14 Drawing Sheets

USER INTERFACE PROVIDING IMMEDIATE STATUS AND CAPABILITY INDICATORS OF AN IMAGING SYSTEM ON A NETWORK BY DISPLAYING CHANNEL CONNECTIONS, FEATURES IN USE, AVAILABILITY, AND CURRENT OPERATIONS

BACKGROUND OF THE INVENTION

The present invention relates to a user interface, in particular, to a technique of immediate presentation to an operator of the concurrence capability of features in a machine as well as immediate presentation of those features in use, available, and not available for a given machine.

To meet modern document needs, document systems have been provided with ever expanding feature sets for various local and remote applications such as document copy, document distribution, document storage, and document printing. In the past, to expand feature sets, existing control panels were usually augmented with more menu layers, an increased number of categories of features, and increased numbers of buttons and icons. As a result, end user operators are often confronted with a control panel search task in order to locate and access the particular set of features and electronic dialogs needed for a particular job.

This has only aggravated job set up complexity for operators. The problem is further intensified when multi-functional features such as fax, print, store, and distribute are required. In these situations, users and operators are often confused on the availability of features and proper selection and combination of features to achieve a given job objective.

U.S. Pat. No. 5,450,571, assigned to the same assignee as the present invention, discloses a dialog filtering process for a printing system to filter out non-selectable print programming selections. U.S. Pat. No. 5,513,126, assigned to the same assignee as the present invention, discloses a network having selectively accessible recipient prioritized communication channel profiles. In particular, a sender can automatically distribute information to a receiver on a network using devices and communication channels defined in a receiver profile. In addition, U.S. Ser. No. 08/329,811 (D/94101) filed Oct. 27, 1994, now U.S. Pat. No. 5,604,860, discloses a method of customizing and storing an interface control for a machine by entering an interface control customizing mode. This provides access to a library of control features for selecting a set of control features for use on a given machine and for arranging the set of control features in a given configuration on a scaled representation of an interface control. The set of control features and given configuration are referenced with a given identifier whereby upon accessing the identifier the set of control features and given configuration are provided on the interface control display. U.S. Ser. No. 08/541,547 (D/95418) filed Oct. 10, 1995, now abandoned, discloses a method a using customized interface control panels.

A difficulty with the aforementioned systems, however, is that they are relatively complicated. For example, U.S. Pat. No. 5,450,571, deals with print queues and providing common electronic job tickets with inter-client protocol and client-server protocol formats including providing printer user interface mask files for each printer. Or they deal with set up, storing and retrieving of customized control panels as disclosed in U.S. Pat. No. 5,513,126 are concerned with communication channel profiles for sending and receiving information over a network.

A further difficulty is that prior art systems do not account for and simplify for the operator the high degree of automation, networking, interdependency, remote operation, concurrency, faxing, scanning, printing, and traditional copier functionality of existing machines. It would be desirable, therefore, to present to the user an immediate indication of the status and capability of a given machine. That is, it would be desirable to give the operator an immediate and easily recognizable indication of the ability of the machine for concurrent operation of features as well as the current use and capability of network connection.

It is an object of the present invention, therefore, to provide a new and improved user interface that mimics machine activities as the activities occur and provides timing information, functional sequences, and capabilities of a given machine in its network environment. It is still another object of the present invention to immediately present to an operator the concurrence capability of features in a machine as well as immediate presentation of those features in use, available, and not available for a given machine. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of providing immediate status and capability indicators of an imaging device to an operator by displaying at the user interface display screen an indicator of imaging device features available for operation as well as a display of imaging device features not available for operation. There is also provided a display of imaging device features in use by animating the display screen and there are displayed connecting channels indicating connection of the imaging device to other devices on the network. Finally, there is presented to the operator a manifestation of the capability of concurrent feature operation of the imaging device.

BRIEF DESCRIPTION OF THE DRAWINGS

For a better understanding of the present invention, reference may be made to the accompanying drawings wherein the same reference numerals have been applied to like parts and wherein.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

Description of Embodiment

Figure 1:
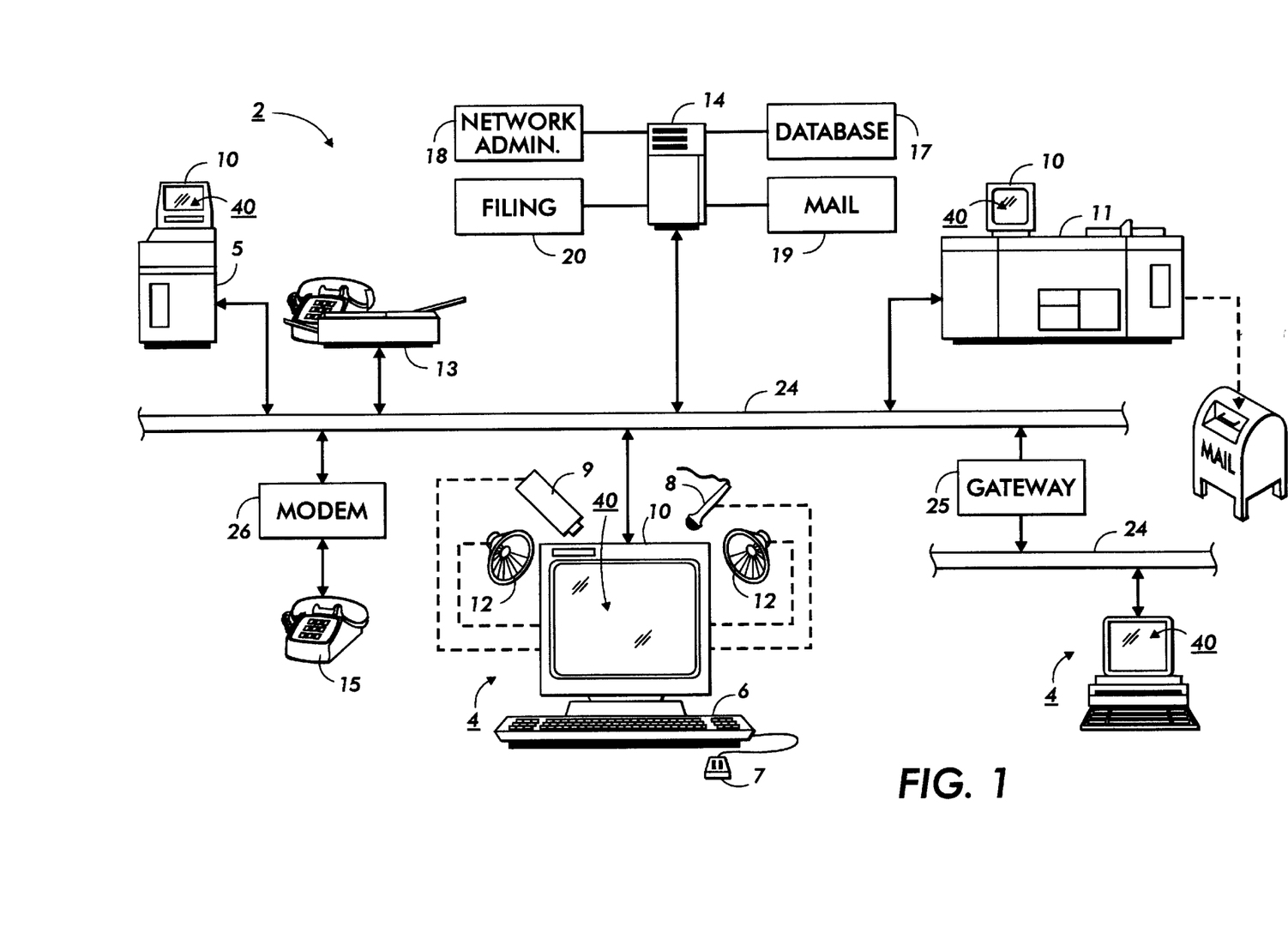
FIG. 1 is an illustration of a system environment incorporating the present invention.

Referring now to the drawings and in particular to FIG. 1, an exemplary multimedia device information system or network 2 including work station 4, enables users to communicate in a transparent and device independent manner. Multimedia system 2 can be implemented using a variety of hardware platforms and includes devices for input including scanner or digital copier 5, keyboard 6, pointing device or mouse 7, microphone 8, and video camera 9.

The system further has devices for output including display terminal 10, printer 11, and speakers 12. Input/output (I/O) devices include facsimile 13, file server 14, and telephone 15. Server 14 is configured central to or remote from work station 4 with public, shared and/or private data storage that is differentiated by user access rights. The server 14 includes relational database system 17, network administration system 18, mail system 19 (e.g. e-mail, voice mail) and data storage and retrieval system 20, and can be physically configured using optical drives, hard drives, floppy drives and/or tape drives. The relational database system 17 provides systems with fast query and retrieval of data.

Work station 4 operates in a collaborative environment, where users at different Work stations 4 can work together in real time to process and distribute public, shared or private information existing in different forms. (Public data is defined herein as data accessible by anyone, shared data is defined as data accessible by a limited number of users and private data is data uniquely accessible by a single user.) Work station 4 can exist in a distributed or centralized environment. In either environment Work station 4 is connected to other systems and devices through local area network (LAN) 24, gateway 25, and/or modem 26. In distributed systems, a number of Work stations extend distributed processing and storage capabilities to each other, by providing for example redundant storage or a single mounting of a unique application.

Work station 4 includes an object oriented user interface (UI) 40 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known.

The invention consists of a small icon like machine mimic with radiating activity vectors or branches. The small machine icon is centrally positioned relative to its feature extension. This puts emphasis where it should be and illustrates the multifaceted, multi tasking, and concurrent activities the system engages in. It also relieves any contention problem by showing system job entry points, times, and feature priorities, e.g. scanning is available while printing.

The model is a metaphor for various products increasing learning-comprehension, and serves as an archetypal logo for related systems graphics, icons, instructional material, and systems collateral. It is a model graphic suitable for a "Touch Me" introductory frame, tutoring the novice user. Programmed Copy-, Scan-, and Fax Out Jobs display anticipated completion time, advising the user when to pick up a job. It provides a walk-up user with information when a job is going to start. The model is visually related to network diagrams, printed circuit boards, and electronic chip design.

This model could be used as a Tutorial Walk-Up screen that would be dynamic in nature, but not necessarily functional. Another alternative is a model that is very functional, showing the system in totality, that makes useful comments on what is currently happening, what is going to happen, and where access points are to get your job done, e.g. scanning while printing. The model also could highlight paper trays being used, their status, etc.

A dynamic display in accordance with the present invention provides immediate status and capability indicators of an imaging device. The indicators include visual prompts to an operator of imaging device features available for operation and of imaging device features not available for operation. The use of animation provides a prompt of device features already in use or operation. Shown, are connecting channels between displayed devices suggesting network connections and capability. In addition, presented to the operator is a manifestation of the capability of concurrent feature operation of the imaging device. That is, those device features that can be operated concurrently are prompted to the operator by a visual dynamic.

Figure 2:
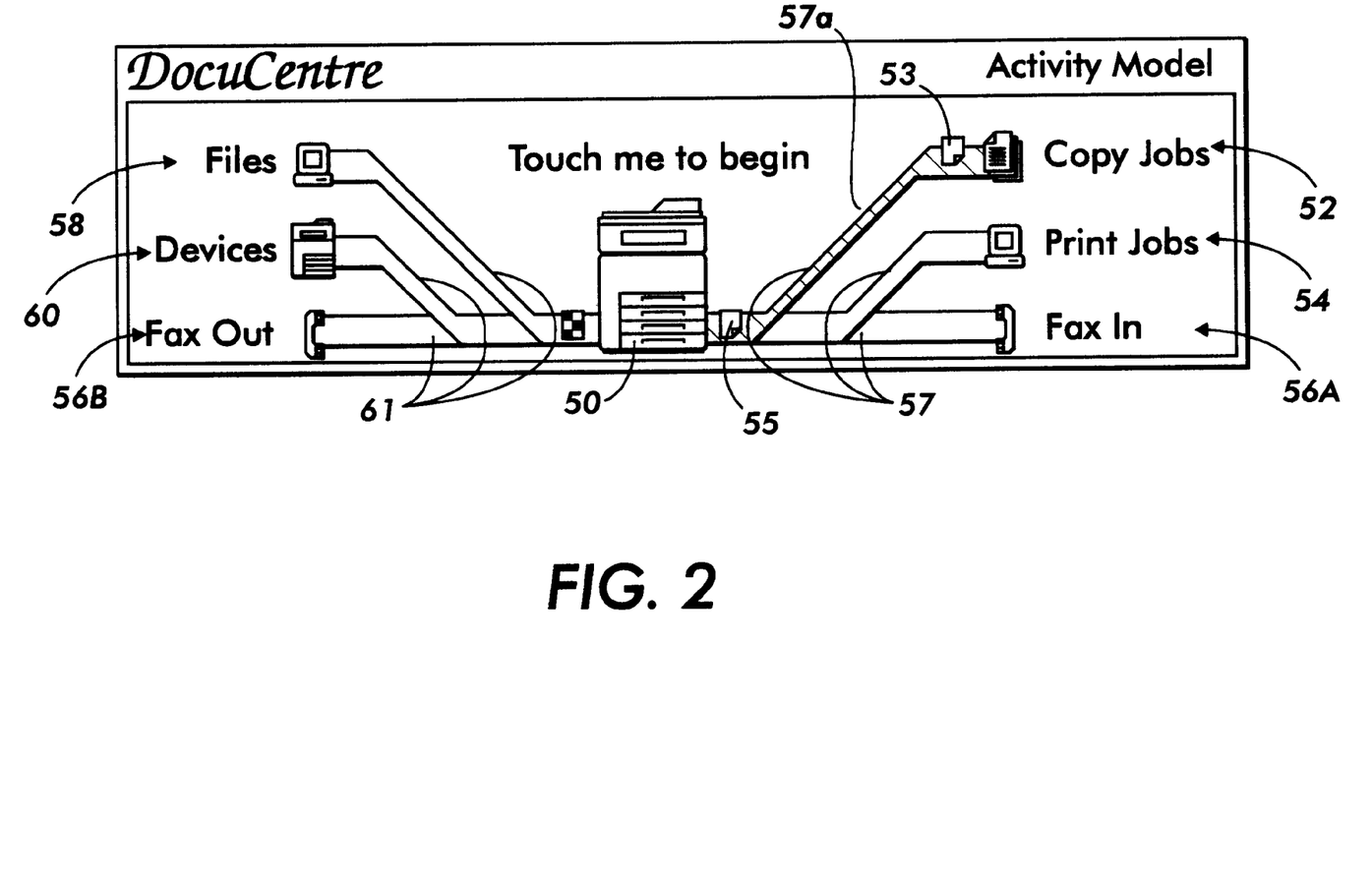
FIGS. 2 through 5 are a representation of various screen displays portrayed to an operator in accordance with the present invention.
Figure 3:
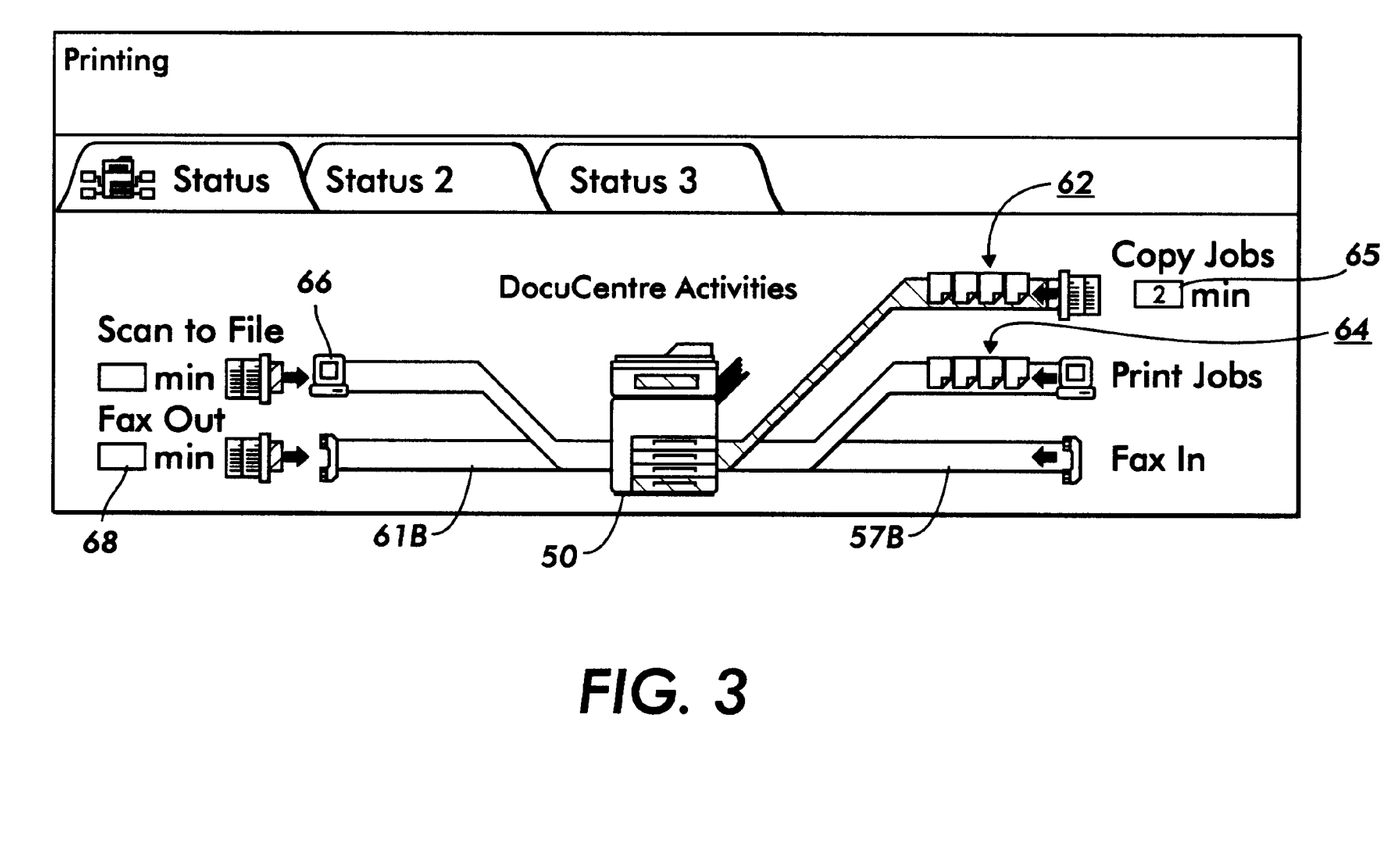
Figure 4:
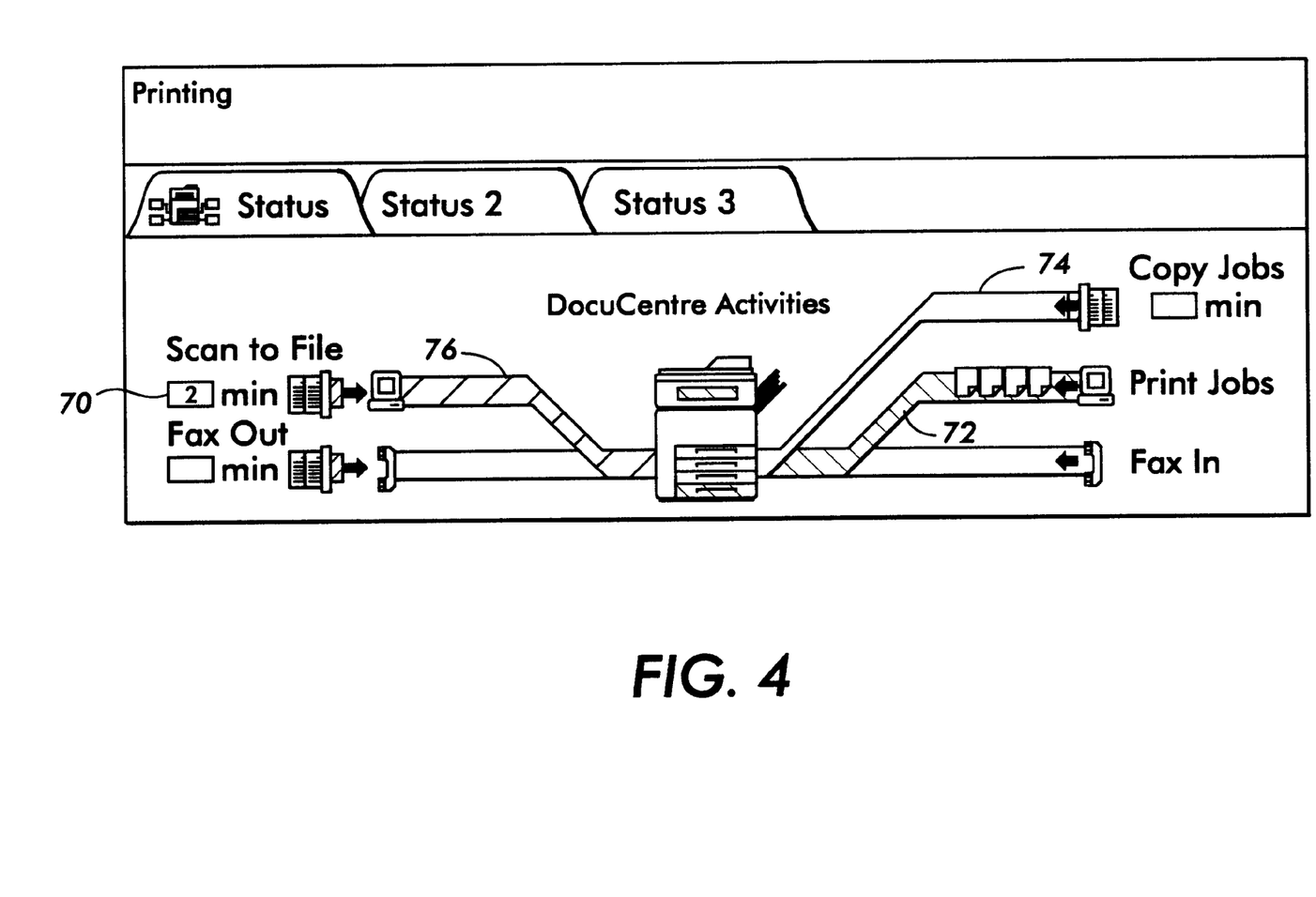
Figure 5:
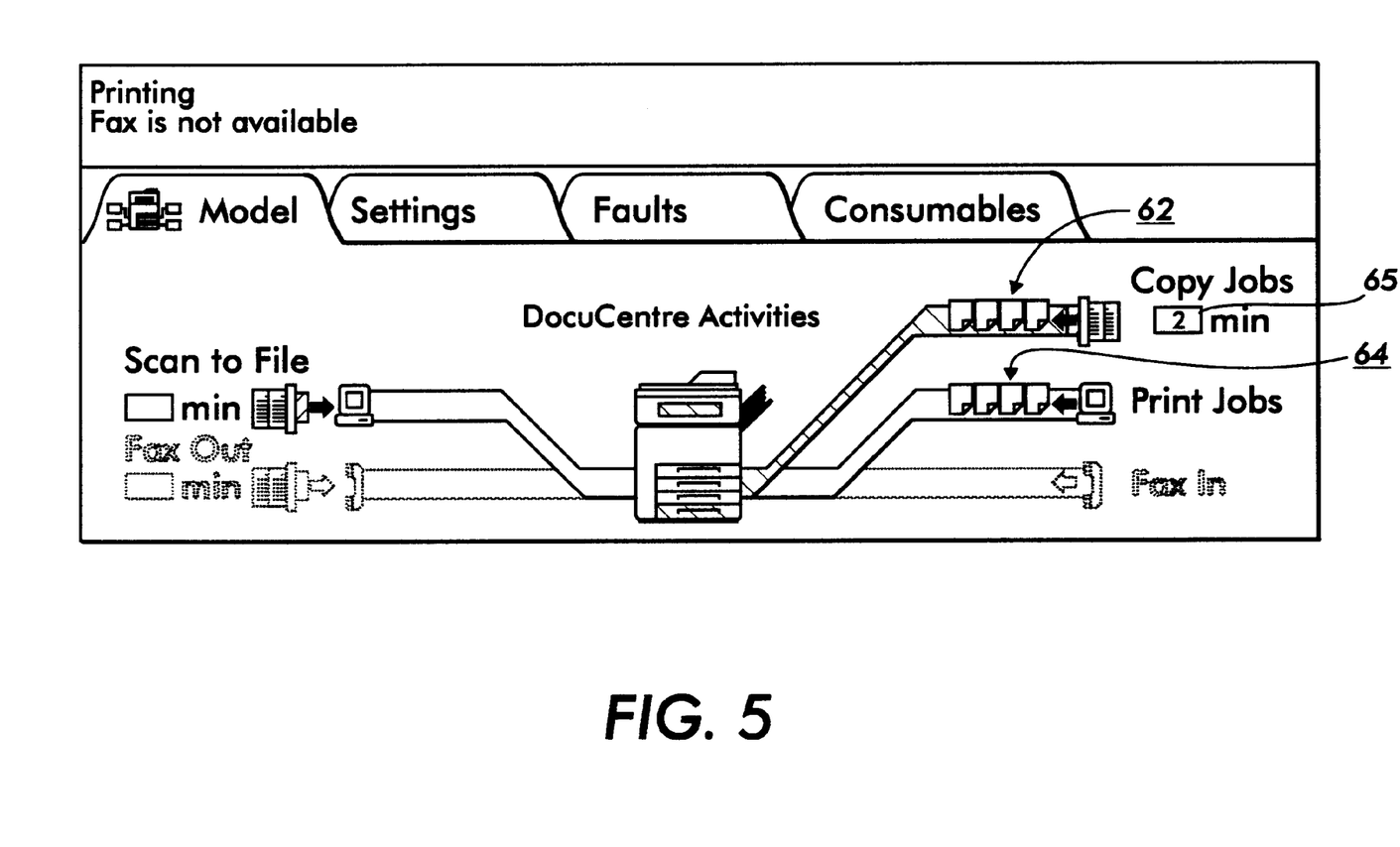
Figure 6:
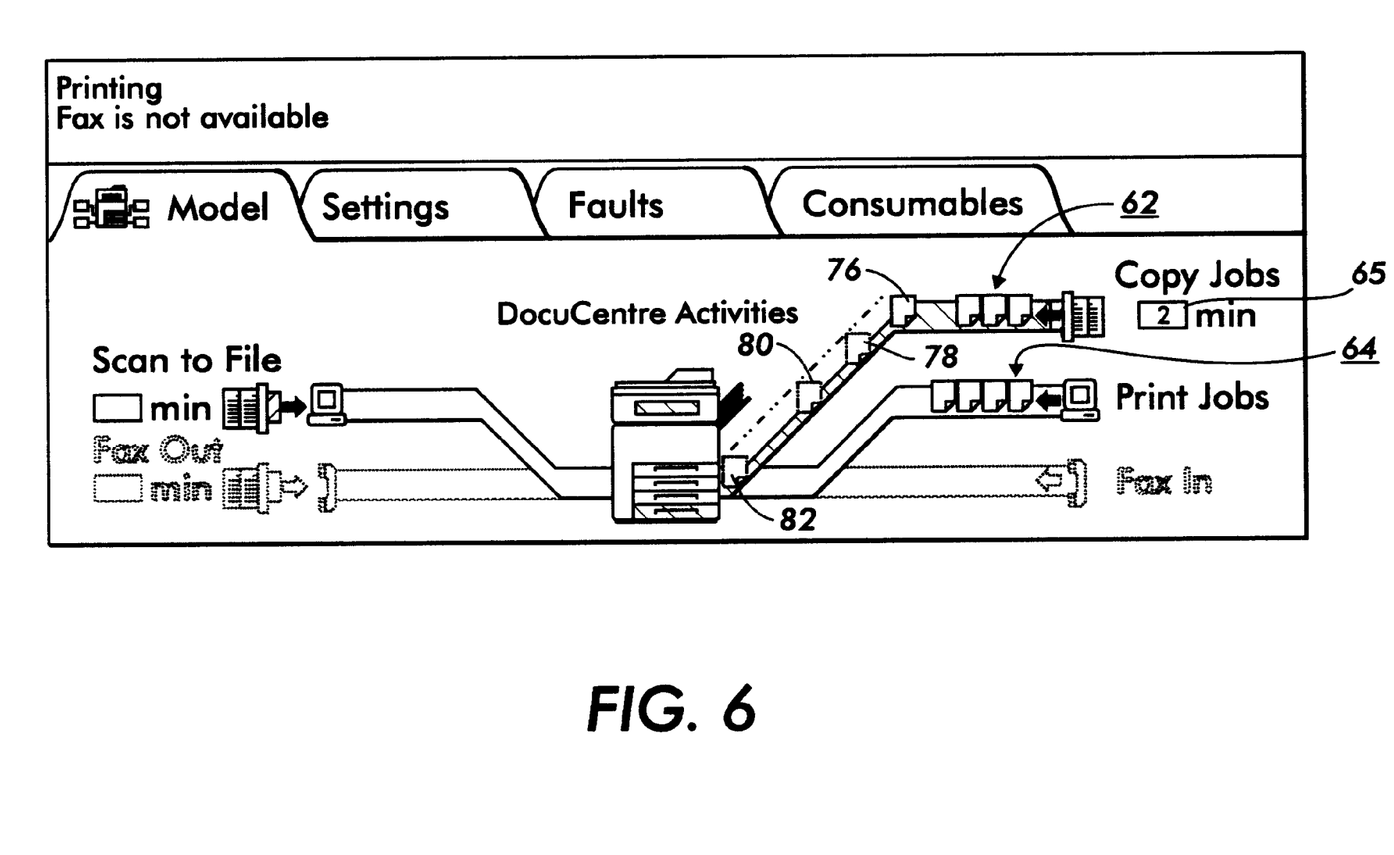
FIGS. 6–9 illustrate a display of a copier job in progress in accordance with the present invention.
Figure 7:
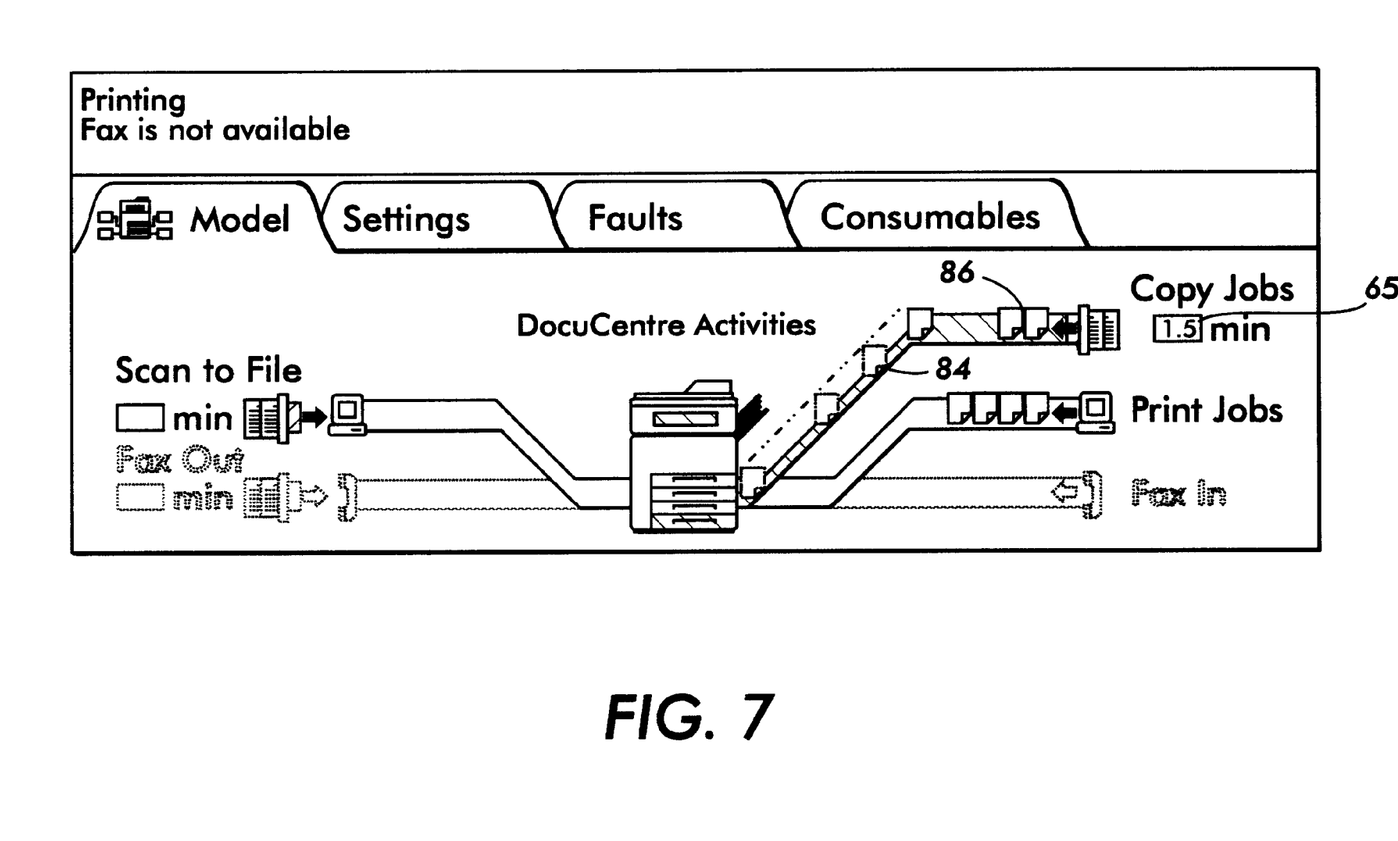
Figure 8:
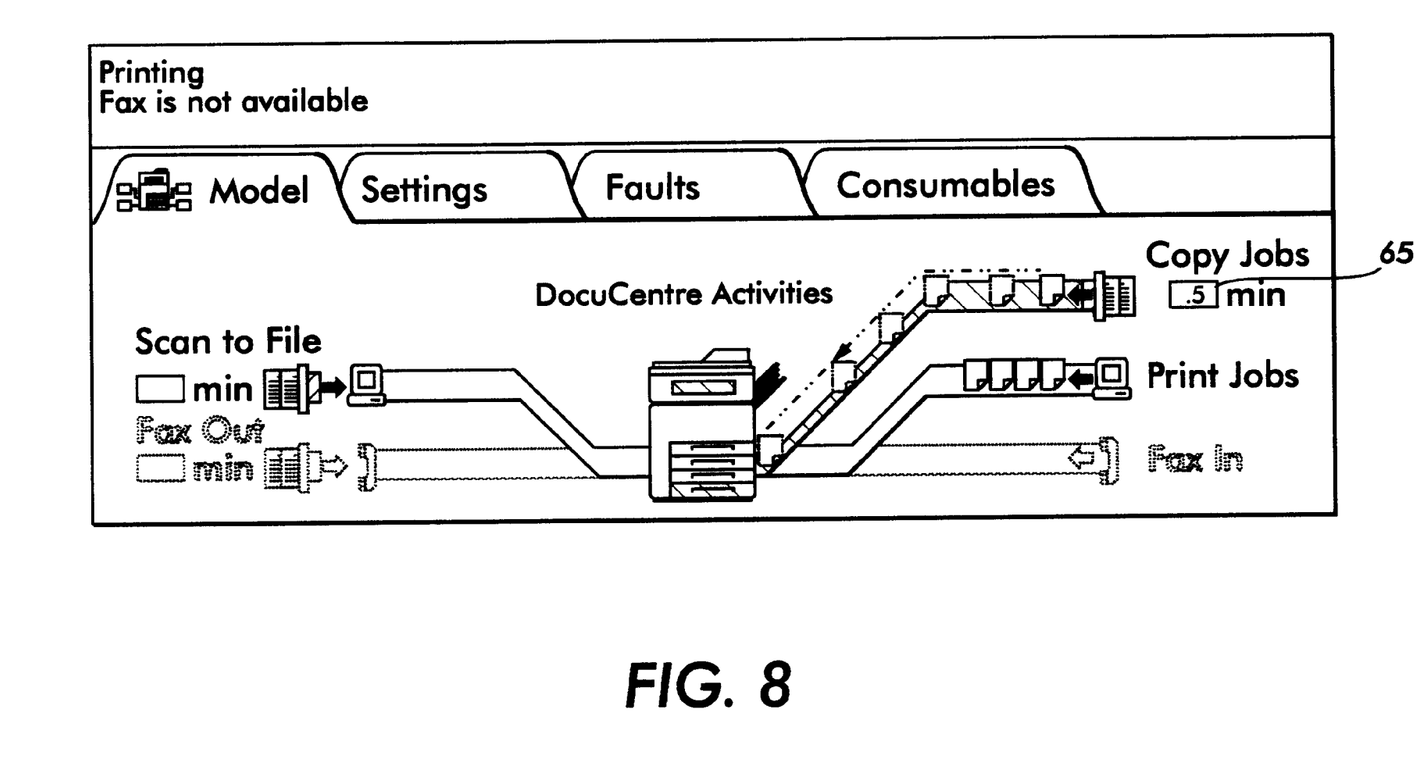
Figure 9:
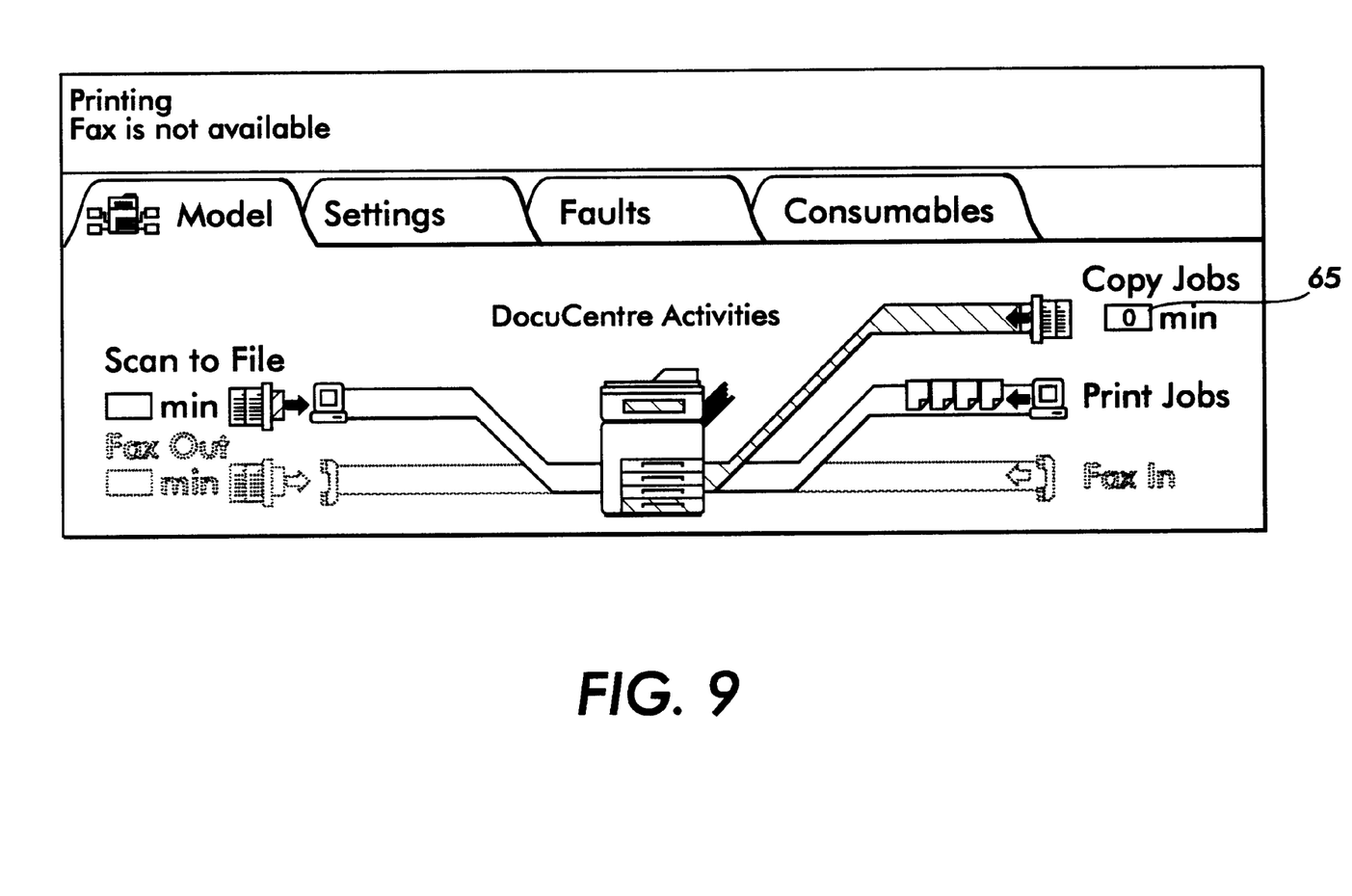
Figure 10:
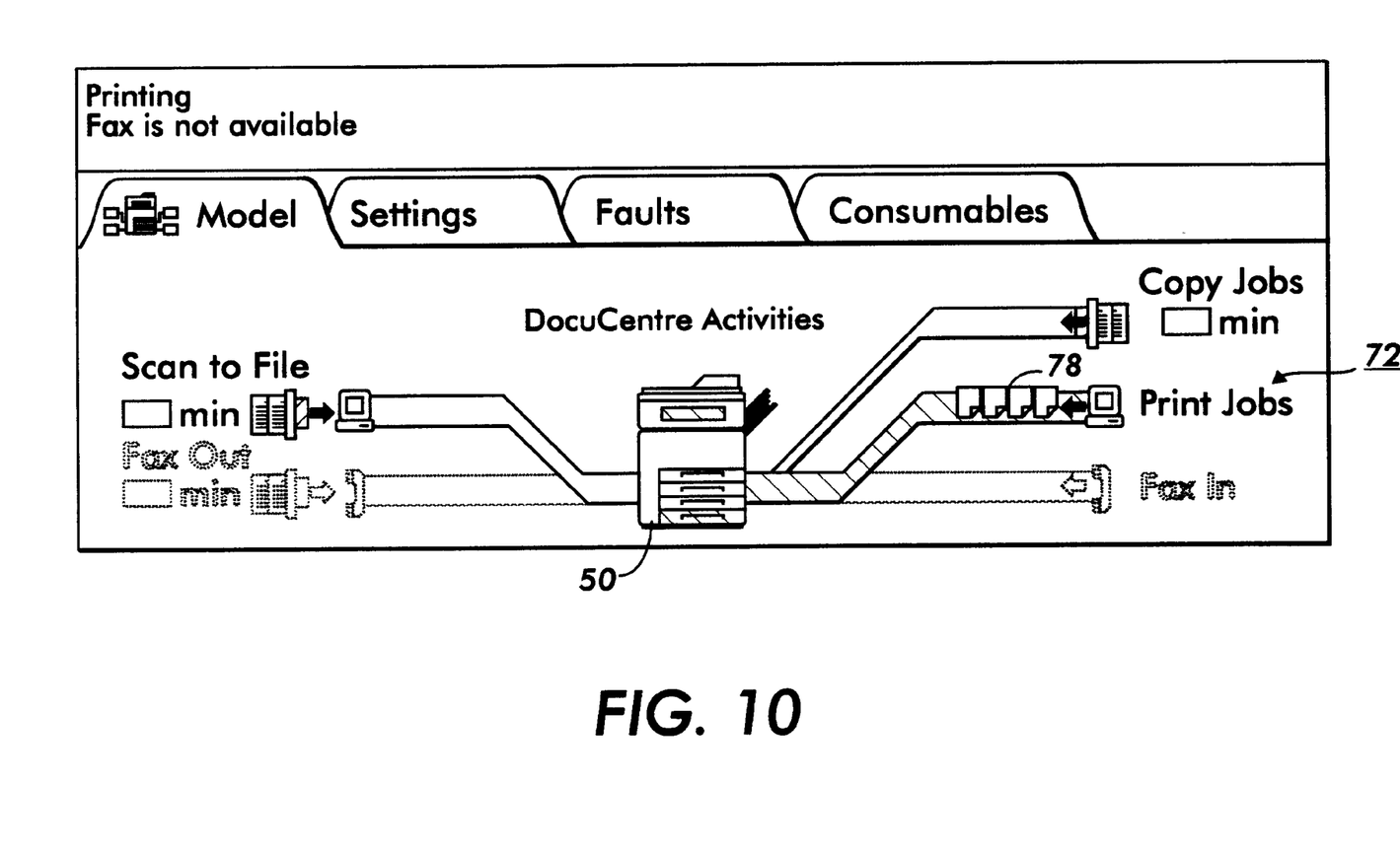
FIGS. 10–13 illustrate a printing job in progress in accordance with the present invention and, FIG. 14 is a flow chart illustrating the immediate presentation to an operator of the concurrence capability of features in a machine as well as immediate presentation of those features in use, available, and not available for a given machine in accordance with the present invention.
Figure 11:
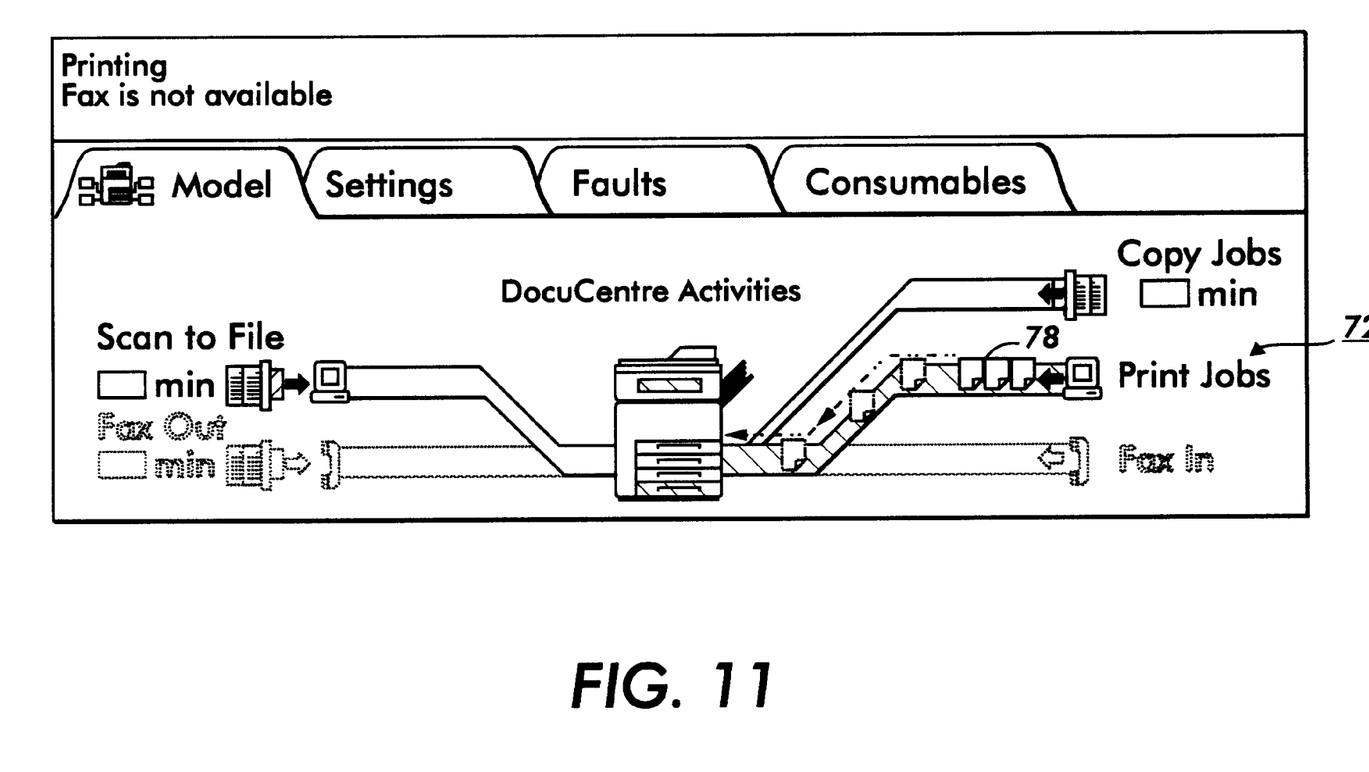
Figure 12:
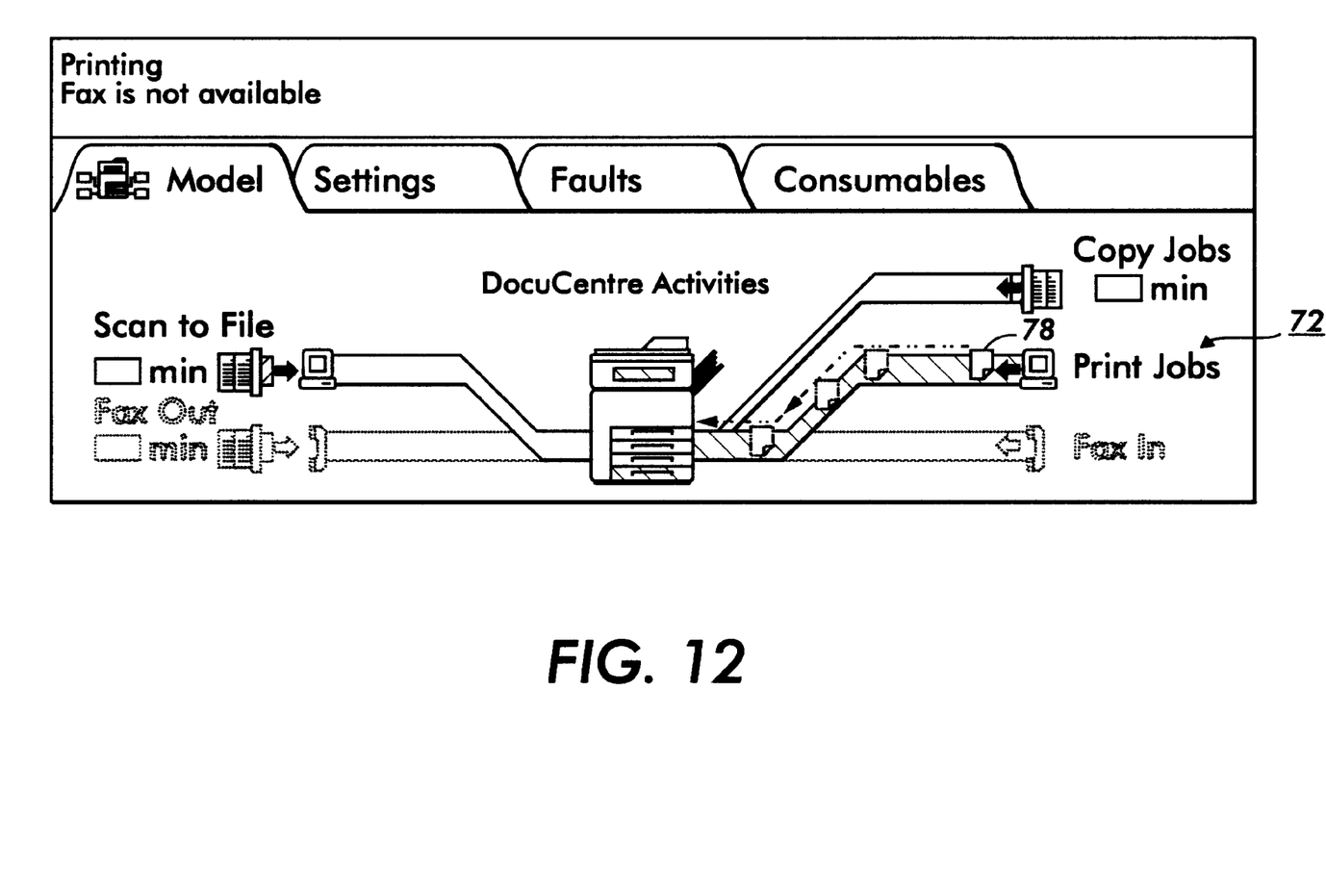
Figure 13:
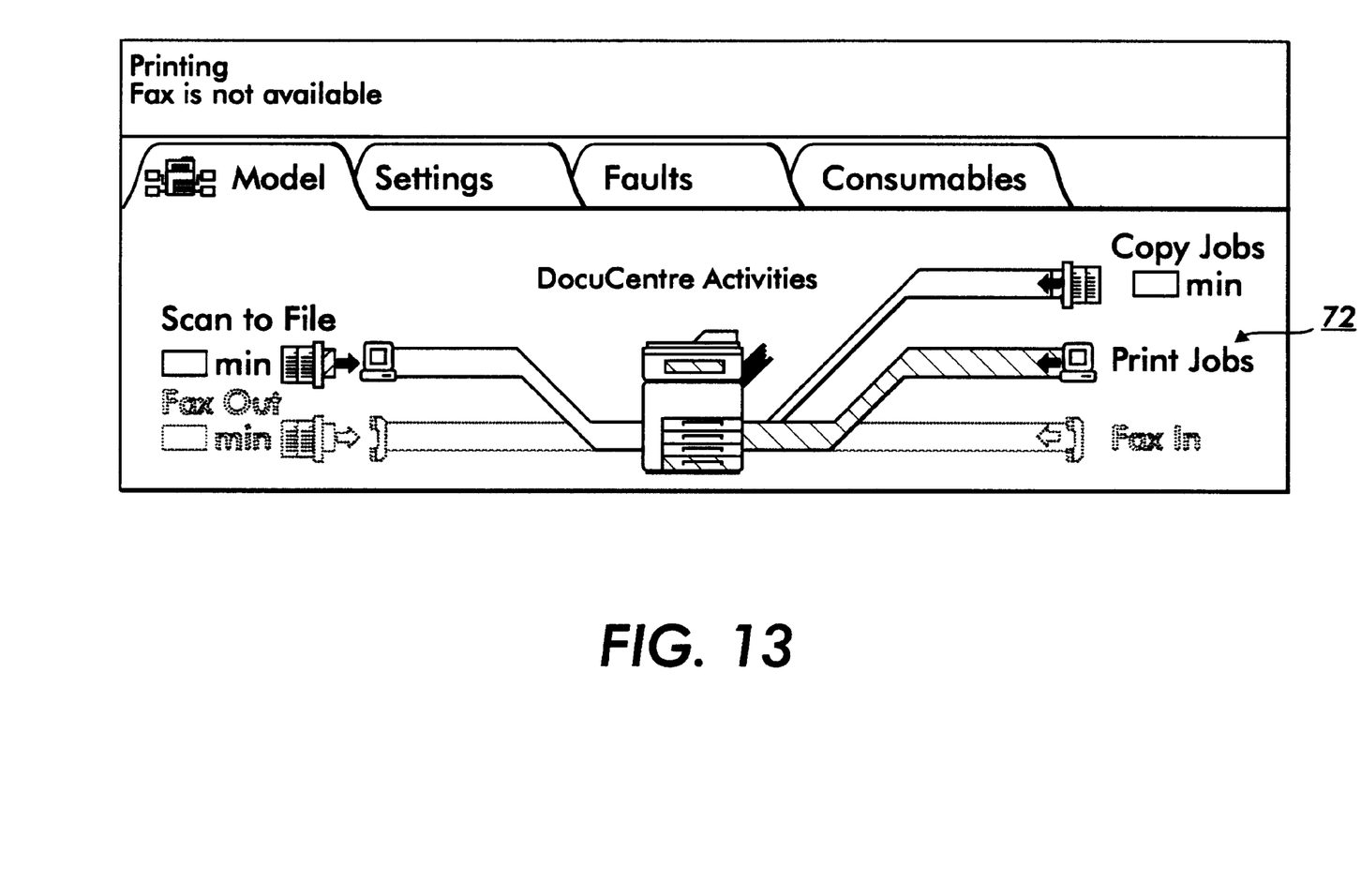

With reference to FIGS. 2, 3, and 4, there is illustrated a dynamic tutorial of machine status. As shown, an imaging machine 50 is interconnected to a copy job status indicator 52, a print job status indicator 54, and fax in job indicator 56A connected to the image device by web of interconnections or network 57. Similarly, a files status indicator 58, device indicator 60, and fax out job indicator 56B are shown connected to the device 50 by a web configuration or a network 61. The darkened portion of the web shown at 57A in segmented manner indicates a current operation of the device 50 in the copy job mode. A not shown phantom designation, FIG. 3, of the connectors 61B and 57B interconnecting fax in, fax out to the device 50 would indicate the fax function as not being available on machine 50. The document designations 53 and 55 illustrate the movement of documents to the machine 50.

FIGS. 2 and 3 illustrate an activity diagram or a machine status mode of device 50. In particular, 62 illustrates a set of documents and 65 illustrates two minutes for a job completion. As the job nears completion, selected documents 62 will be illustrated as traversing the connector 57A to be illustrated as input to the device 50. When the job progresses, the time to completion illustrated will be commensurate with the percentage of documents that have accumulated at the device 50. Similarly, there is a fax out display at 68 to illustrate the time to completion of a fax job being sent out from device 50 if the device includes such a feature.

In FIG. 4, channel or web segment 74 can be lightened or faded to indicate 'not in use' and the channel 72 is highlighted or darkened to illustrate that a print job is now in process. Also the web or channel 76 can be highlighted or shaded to indicate that a scan to file is taking place and that it is taking place concurrently with the print job operation. The display 70 illustrates the time to completion of the scan to file portion of the job. It should be noted that it is merely a design choice to use any form of shading, highlighting, cross hatching, phantom display, or any other screen technique to illustrate machine states. These states include various features and options such as feature availability, current feature use, the capability of concurrent use of features, the unavailability of features, and progressive or animated display.

The sequence of the copy job operation is further illustrated with reference to FIGS. 5–9 showing a count down of the time to completion in window 65 as the documents 62 are depleted. Fax In and Fax Out are shown in phantom, indicating these functions are not available on this given machine. In addition, FIGS. 10–13 indicate completion of a print job illustrated by documents 78 by the movement of the documents to the device 50. It should be understood that this is an animated display and along with the alternate shading of the connecting webs or network stated above, enables the operator to immediately observe and determine the current operation of the machine, the features that are available or are not available on the machine, the capability for concurrent operation of selected features, as well as the degree of completion of the various selected features.

Figure 14:
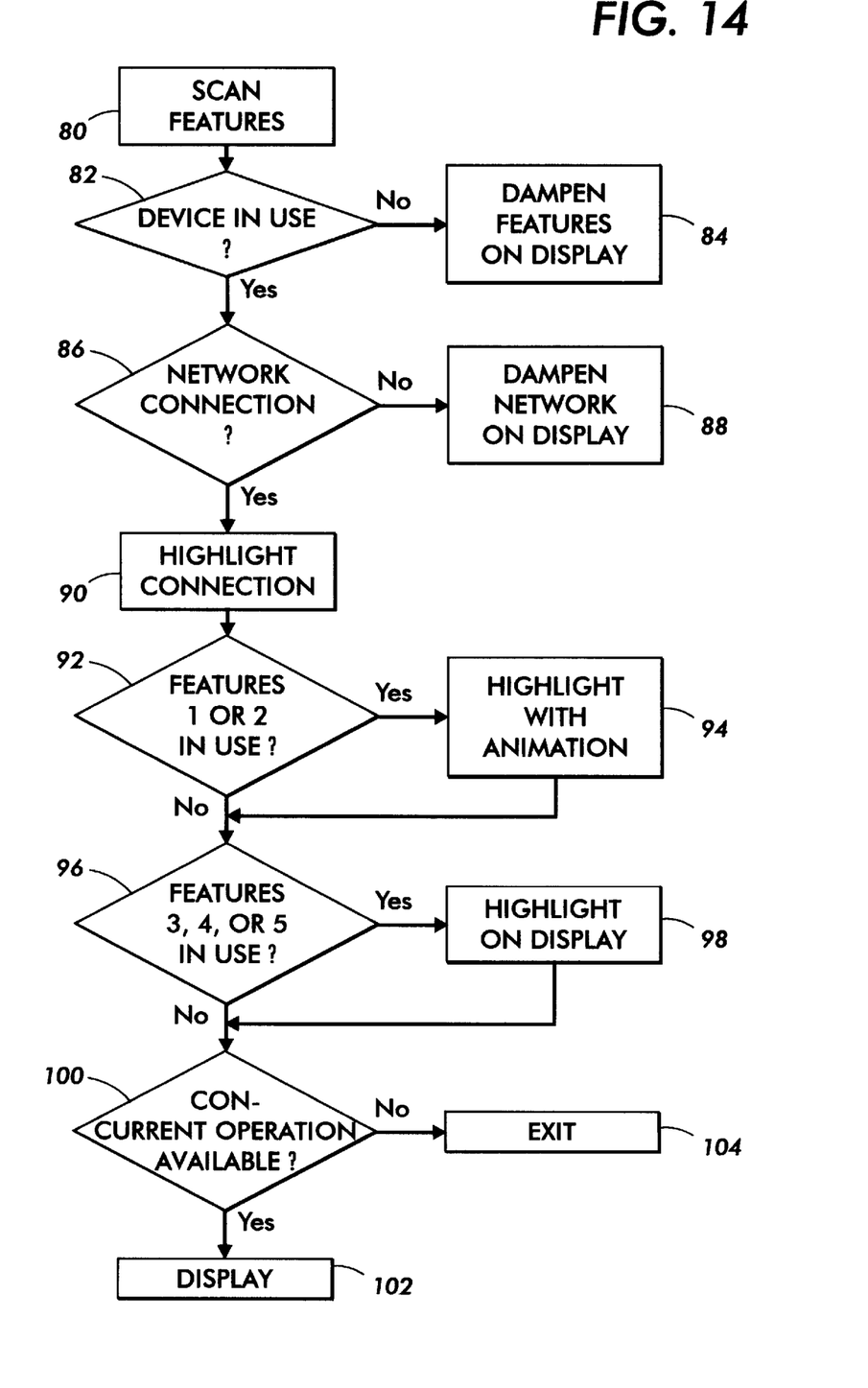

These features are illustrated with reference to the flow chart of FIG. 14. In particular, the various features are scanned as shown in block 80 and if a device is in use, a decision is made as illustrated in decision block 82. If the device is not in use, then the feature is blocked out of the screen display as illustrated at 84. If the device is in use, then, as illustrated in block 86, a decision is made as to whether or not it is part of a network connection. If not, the portion of the display illustrating a network connection is faded or eliminated as shown in block 88. If there is a network connection, as shown in block 90, the connection is highlighted on the display.

Next there is a determination whether or not selected features such as features 1 or 2 are in use as shown in block 92. These typically are features such as a copy jobs operation or print jobs operation where animation on the screen is appropriate to illustrate the concurrency and nearness of completion of the job. If there are such features, as shown in block 94, these features are highlighted on the display with animation. If no such features, then there is a determination if other features are in use as illustrated in decision block 96. If 'yes', then these features are highlighted on the display as shown in block 98. Even if there are no such features there must be a determination whether or not concurrent operation is available as illustrated at block 100. If concurrent operation is available or possible on a given machine, then the display is illuminated or back dropped to suitably display concurrency as shown in block 102. If not, the scanning and displaying is complete and the scan operation is exited as shown in block 104.

While the invention has been described with reference to the structure disclosed, it is not confined to the details set forth, but it is intended to cover such modifications or changes as may come within the scope of the following claims.

We claim:

1. In an imaging device including a user interface with display screen providing a plurality of feature selections, the imaging device being connected to a network, a method of providing immediate status and capability indicators of the imaging device to an operator comprising the steps of:

displaying at the user interface display screen an indicator of imaging device features available for operation and a display of imaging device features not available for operation, providing at the user interface display screen a display of imaging system features in use including the step of animating the display screen, showing connecting channels on the display screen indicating connection of the imaging device to other devices on the network, and presenting to the operator a manifestation of the capability of concurrent feature operation of the imaging system whereby the operator is furnished an immediate representation of the status and capability of the imaging system.

2. The method of claim 1 wherein the step of presenting to the operator a manifestation of the capability of concurrent feature operation of the imaging system includes the step of visually linking indicators of features capable of concurrent operation.

3. The method of claim 1 wherein the features capable of concurrent operation are printing and scanning operations.

4. The method of claim 1 wherein the features capable of concurrent operation are printing and facsimile operations.

5. In an imaging system including a user interface with display screen providing a plurality of feature selections, a method of providing immediate status and capability indicators of the imaging system to an operator comprising the steps of:

displaying at the user interface display screen an indicator of imaging system features available for operation, providing at the user interface display screen a display of imaging system features in use, and presenting to the operator a manifestation of the capability of concurrent feature operation of the imaging system including the step of visually linking indicators of features capable of concurrent operation including a connecting channel indicating connection of devices on a network whereby the operator is furnished an immediate representation of the status and capability of the imaging system.

6. The method of claim 5 including the step of providing a display of features not available to the imaging system.

7. The method of claim 5 wherein the step of providing at the user interface display screen a display of imaging system features in use includes the step of animating the display screen.

\* \* \* \* \*